Figure 1A:
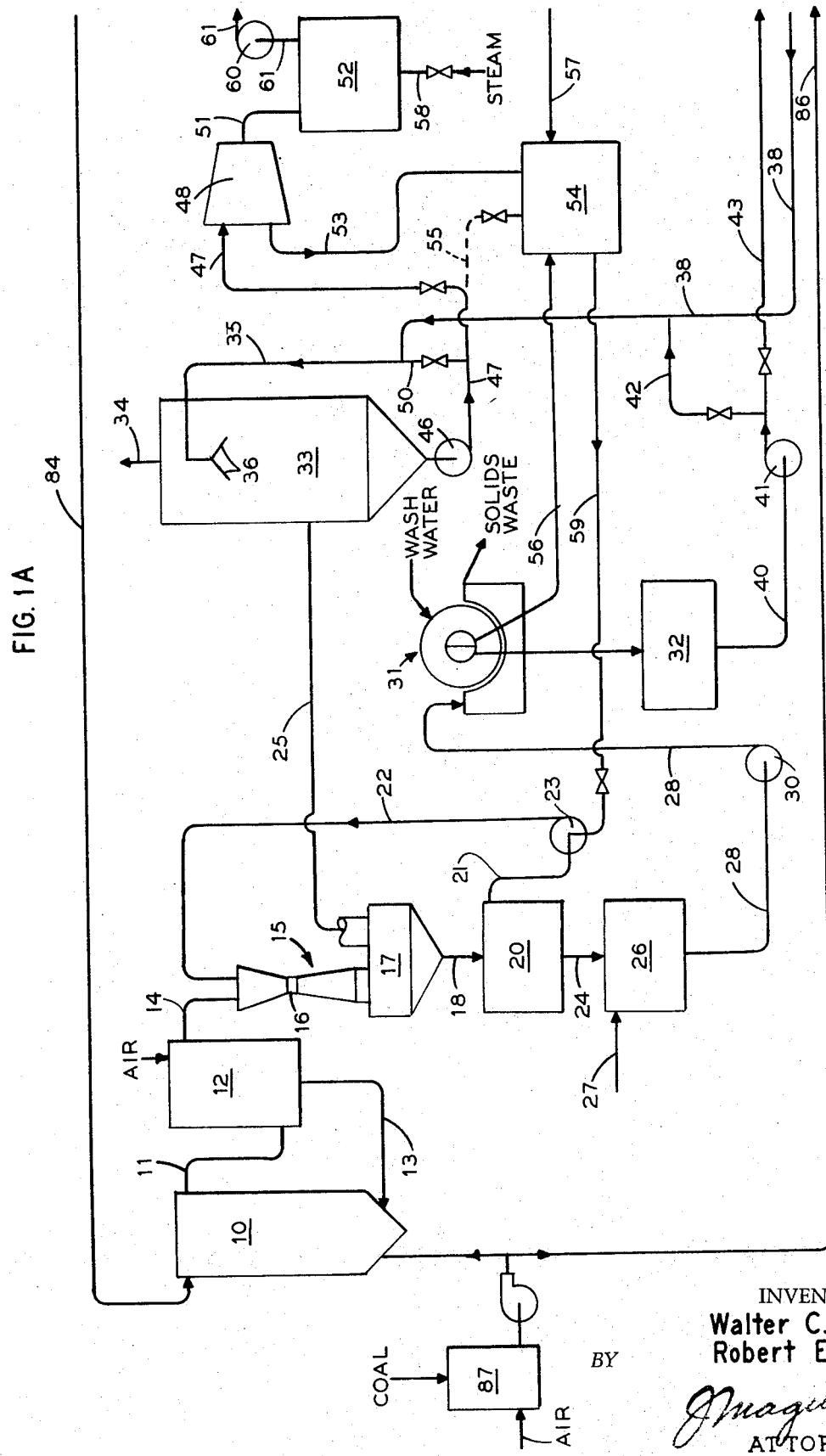

United States Patent [19]

Lapple et al.

[11] 3,758,668
[45] Sept. 11, 1973

[54] SO₂ ABSORPTION SYSTEM WITH REGENERATION OF ABSORBENT

[75] Inventors: Walter C. Lapple; Robert E. Matty, both of Alliance, Ohio

[73] Assignee: The Babcock of Wilcox Company, New York, N.Y.

[22] Filed: Aug. 11, 1970

[21] Appl. No.: 62,930

[52] U.S. Cl............ 423/242, 423/242, 423/522, 423/541, 423/574, 423/638, 423/554
[51] Int. Cl................ B01d 47/02, C01b 17/60
[58] Field of Search............ 23/167, 168, 178, 23/2 SQ, 178 S, 313, 224, 227; 75/67; 423/215, 242, 512, 522, 541, 542, 554, 574, 638

[56] References Cited
UNITED STATES PATENTS

| 3,577,219 | 5/1971 | Shah | 23/168 |
|---|---|---|---|
| 2,804,373 | 8/1957 | Dancy | 23/313 X |
| 2,903,337 | 9/1959 | McGinnis et al. | 23/224 X |
| 3,273,961 | 9/1966 | Rogers et al. | 23/178 S X |
| 3,320,906 | 5/1967 | Domahidy | 23/178 R X |
| 3,492,083 | 1/1970 | Lowicki et al. | 23/178 R X |
| 3,520,649 | 7/1970 | Tomany et al. | 23/178 R X |
| 3,533,748 | 10/1970 | Finfer et al. | 23/178 R X |

FOREIGN PATENTS OR APPLICATIONS 438,582  11/1935  Great Britain...................... 23/2 SQ

OTHER PUBLICATIONS

Pinaev, Chem. Abs., Vol. 59, p. 13621e (1963).

Primary Examiner—Oscar R. Vertiz
Assistant Examiner—J. Cooper
Attorney—J. Maguire

[57] ABSTRACT

A system for removing gaseous $SO_2$ from the flue gases resulting from the combustion of carbon and sulphur containing fuel, where the absorbent liquid contains magnesium and the product liquid consists of magnesium sulphite crystals. The magnesium sulphite crystals are treated to reduce the water of hydration, and then pelletized with carbon for subsequent thermal treatment to release reactive MgO particles reuseable in the absorption system and a gaseous effluent containing $SO_2$. The gaseous $SO_2$ can then be converted to sulphuric acid or sulphur solids.

11 Claims, 2 Drawing Figures

Patented Sept. 11, 1973

3,758,668

2 Sheets-Sheet 1

INVENTORS
Walter C. Lapple
Robert E. Matty

BY *Maguire*

ATTORNEY

SO₂ ABSORPTION SYSTEM WITH REGENERATION OF ABSORBENT

The present invention relates to the reduction or elimination of sulphur dioxide from gases, and more particularly to the absorption of sulphur dioxide from flue gases resulting from the combustion of fossil fuels.

In the combustion of fossil fuels containing sulphur, the gaseous products will contain sulphur oxides which can be a public nuisance when discharged to the atmosphere. Many attempts have heretofore been made to reduce the sulphur oxide contents of flue gases discharged to the atmosphere and from a technical standpoint many such have been successful. However, from a strictly economic standpoint the removal of sulphur dioxide from the products of the combustion of fossil fuel has not heretofore been justified. Public pressure is forcing the reduction or elimination of this form of air pollution and the public utility industry in particular is being forced to reduce the contaminants in stack emissions to the atmosphere. The problem at the present time is to improve the collection efficiency of methods used in the removal of the $SO_2$ from the flue gases and to convert such sulphur into a usable or salable form so as to minimize the economic loss while at the same time reducing air pollution emissions to the atmosphere.

According to the present invention the flue gases resulting from the combustion of a fossil fuel containing sulphur are passed through a device to remove the particulate matter entrained in the gases, conditioned as to temperature before and/or after particulate matter removal, and then scrubbed in an aqueous absorption medium to absorb the sulphur-containing gases therein. The substantially dust and gaseous sulphur free flue gases are then passed to the atmosphere. In this invention the absorption medium is a slurry containing magnesium oxide wherein the $SO_2$ is absorbed to form magnesium sulphite crystals in the slurry. Thereafter the magnesium sulphite crystals are separated from the slurry, with the slurry and suitable make-up materials recirculated to the absorption zone. The crystals are heated to reduce the water of crystallization, pelletized with carbon and a binder with the pellets thermally treated for dissociation into reactive MgO particles and gaseous $SO_2$. The MgO is returned to the absorption zone, while the $SO_2$, which may be of high purity, may then be converted to a salable product such as sulphuric acid or elemental sulphur.

Figure 1B:
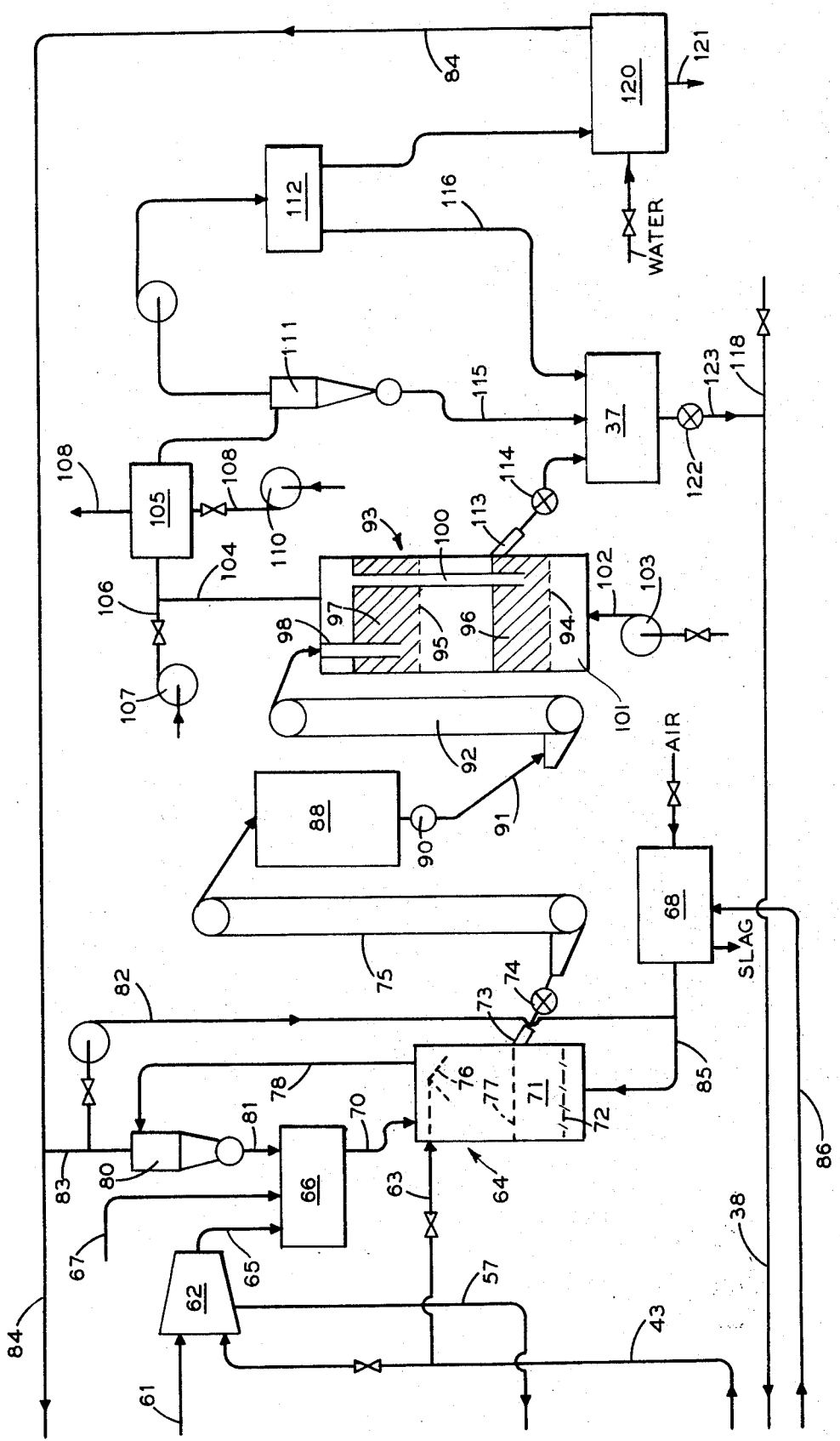

The drawing, FIGS. 1A and 1B, is a schematic showing of an $SO_2$ absorption system constructed and arranged in accordance with the present invention.

While the invention is illustrated, and will be described as applied to a utility boiler fired by pulverized coal, for example, it will be understood the invention can be used in connection with the combustion of other fossil fuels and in other types of installations. For example, liquid fuels or even gaseous fuels containing sulphur, in addition to solid fuels, can be burned in the illustrated furnace, and the heat generated by the combustion can be used for purposes other than vapor generation and heating.

As shown in the drawing, pulverized coal is burned in a furnace-boiler unit 10 in a manner well known in the art. The hot gases of combustion will give up its heat in direct contact with heating surfaces to generate and heat steam with relatively low level heat being passed through a duct 11 and used in an air heater 12 to heat combustion air which is passed through duct 13 to the furnace of unit 10. The gases will leave the air heater 12 through a duct 14 at a temperature in the range of 225°–500°F, for example, and are passed through a duct collector 15 for removal of particulate matter therefrom.

In the illustrated embodiment of the invention, the dust collector 15 is of the wet scrubber type, and more specifically is a wetted wall venturi scrubber 16. It will be understood that other types of dust collectors can be used, but in the particular arrangemnt shown, it is of considerable advantage to use the wet type scrubber for reasons which will hereinafter become apparent. The wetted wall venturi scrubber 16 is well known in the art where the structure is intended to provide intimate contact between a spray liquid and the incoming dust-laden gas. In this particular application, the gas velocity through the throat is relatively low for low gas pressure drop of flow therethrough. The gas is contacted by the spray liquid where the dust particles are agglomerated and entrapped so that at least the larger sized particles will be deposited in the lower part of the scrubber. Ordinarily, some of the finer dust particles will escape and continue with the gas stream leaving the scrubber.

The lower diverging portion of the venturi 16 discharges into a tank 17 which forms a sump or reservoir of mixed solids and liquid which collect therein and are discharged periodically or continuously through a pipe 18 to a storage tank 20 which acts as a settling chamber to permit gravity separation between liquid and solids. The relatively dust-free gases pass from the upper portion of the tank 17 through a conduit 25 to an absorption zone 33 hereinafter described. The tank 20 thus serves as a thickener with the relatively cleaner liquid withdrawn from the upper part through pipes 21 and 22, and pump 23 for recirculated flow to the venturi 16.

The thicker mixture of solids and liquids is discharged through pipe 24 into a reaction tank 26 which is provided with an inlet pipe 27 for the addition of dolomite used as a chemical makeup ingredient for the system as hereinafter described. The chemistry of the reaction can be expressed as follows:

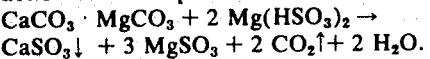

$CaCO_3 \cdot MgCO_3 + 2\ Mg(HSO_3)_2 \rightarrow$
$CaSO_3\downarrow + 3\ MgSO_3 + 2\ CO_2\uparrow + 2\ H_2O$.

The $CaSO_3$ formed is insoluble and can be removed by filtration. The solids-laden liquid is withdrawn from the reaction tank 26 by a pump 30 and discharged through a pipe 28 to a filter 31 for separation of solids from the liquid with the solids discharged to waste. The liquids from the filter are accumulated in a filtrate storage tank 32 for subsequent use in the system.

With a large portion of at least the coarser dust or solid matter removed from the flue gases, the relatively clean gases leaving the venturi scrubber 16 pass through the duct 25 to an absorption tower 33 wherein the gases are contacted by an absorbent liquid made up predominantly of a slurry of magnesium oxide and magnesium hydroxide. The absorbent liquid absorbs the gaseous $SO_2$ contained in the flue gases so that the gases discharged from the absorbent tower are substantially free of dust and $SO_2$ upon their discharge to the stack 34.

In the illustrated embodiment of the invention, the asorbtion tower 33 may be of any suitable type which is well known in the art. For example the absorbent tower may be of the type generally known as the bubble-tray type or it may consist of a series flow type of venturi scrubber system. However, for purposes of the present invention, we prefer to use a type of absorbent device capable of retaining liquid in a tower a sufficient time to encourage absorption.

In operation, the absorbtion tower 33 is supplied with absorbent slurry or liquid through a pipe 35 and nozzles 36 with a slurry containing 10 to 50 percent solids, for example 30 percent solids. The solid containing absorbent liquid is predominantly formed by mixing magnesium oxide with carrier water during transfer from an MgO storage tank 37 (See FIG. 1B) with the slurry passed through pipe 38. If found desirable under particular circumstances the MgO may be slaked prior to delivery to the tower 33. As shown in the drawing, some of the absorbent liquid utilized in the tower 33 originates in the filtrate from the filter 31, as passed through pipe 40 and pump 41. The discharge from pump 41 is arranged for selective flow through valved pipe 42 connected with pipe 38, and through valved pipe 43 which discharges into a centrifuge 62 (See FIG. 1B) as hereinafter described. After countercurrent contact between the gases and the slurry in the tower 33, the slurry accumulates in the hopper bottom and is withdrawn at a controlled rate by a pump 46 and passed through a pipe 47. The pipe terminates at a centrifuge 48, and is also provided with a valved branch pipe 50 which connects with the pipe 35 leading to the nozzles 36 in the tower 33. Thus the slurry discharged through pipe 35 as a spray in the tower 33 to absorb $SO_2$ in the gases passing therethrough is formed as a mixture of reclaimed MgO slurry passed through pipe 38, filtrate from tank 32 passed through pipe 42, and recirculated slurry from the bottom of the tower as added through pipe 50.

The centrifuge 48 separates liquid from the magnesium monosulphite crystals formed by the contact between the $SO_2$ containing gas and the absorbing slurry in the absorption tower 33. The crystals consist predominantly of magnesium monosulphite in a relatively pure form although it is apparent that some of the solids which originated in the fuel ash will also be included with the monosulphite crystals discharged from the centrifuge. The monosulphite crystals leaving the centrifuge through pipe 51 will be generally of the form $MgSO_3 \cdot 6 H_2O$ since the water of hydration will be quite high in this process. The crystals from the centrifuge pass through pipe 51 to a crystal converter 52 which is heated by steam, for example, to a temperature of the order of 200°F. Heating the crystals will convert those crystals to $MgSO_3 \cdot 3 H_2O$ thereby reducing the water content without otherwise having any particular deleterious effects on the crystals. Experience has indicated heating the crystals to higher temperatures than approximately 200°F. to further reduce the water of crystallization will ordinarily also tend to cause degradation of the crystals by releasing $SO_2$ and MgO therefrom.

The liquid discharged from the centrifuge 48, which will include at least some magnesium sulphite in solution and other ingredients which would be soluble in the mother liquid are passed through a pipe 53 to a filtrate tank 54 which may also receive liquid directly from the absorption tower 33 through valved pipe 55 when such flow is necessary or desirable. The filtrate tank 54 also receives washings through pipe 56 directly from filter 31. Additional liquid is also received in the tank 54 from further separation of crystals from slurry (as hereinafter described) through pipe 57. A pipe 59 connects tank 54 with pump 23 for makeup liquid used in the venturi 16.

With the crystals entering the crystal converter 52 in the form $MgSO_3 \cdot 6 H_2O$, and being heated to a temperature of the order of 200°F by steam introduced through valved pipe 58, and thereby converted to the form $MgSO_3 \cdot 3 H_2O$, the slurry is drawn therefrom by pump 60 through pipe 61 for delivery to a second centrifuge 62. The centrifuge 62 also receives liquid from the tank 32 through pipe 43 which is provided with a valved branch pipe 63 leading to a dryer 64, hereinafter described.

The liquid separated in the centrifuge 62 is passed through pipe 57 to tank 54 while the solids pass through line 65 to a pug mill 66 of known construction. In the pug mill 66 the crystals are combined with pulverized coal, for example, introduced through line 67 for mixing so that pellets may be formed for subsequent thermal treatment of the magnesium sulphite crystals.

From the pug mill 66, the mix is delivered through pipe 70 to a drier 64 which is of the fluidized bed type for convenience in pelletizing the materials and is provided with hot fluidizing gases from a pulverized coal fired furnace 68. In forming the pellets it is desirable to use a binder so that the pellets will have sufficient physical integrity and a hardness which permits handling. In the embodiment shown, the binder consists of magnesium sulfate which is present in the liquid in the filtrate storage tank 32 where the liquid used in scrubbing the flue gases is accumulated. This liquid is delivered in proper amounts directly to the dryer 64 through pipe 63 to spray the pellets and to encourage the formation of hardened pellets in the dryer.

The dryer 64 shown is of conventional fluidized bed construction, with the raw mix delivered thereto at a controlled rate from the pug mill through a pipe 70 to the bed 71 formed above the grid 72. An overflow discharge conduit 73 is provided with a seal, such as a star feeder 74, for controlled withdrawal of hard dried pellets to the lower end of a mechanical elevator 75. The liquid binder introduced through the pipe 63 is sprayed through nozzle 76 positioned in the free-board space above the nominal upper level 77 of the fluidized bed 71. The binder forms a coating on the pellets during the heating period, and while some binder ingredients may be discharged through a vent conduit 78 the major portion of the vapors and gases passed through the conduit are not lost to the system. After passing through a cyclonic type separator 80 to removed entrained solids which are returned to the pug mill 66 through conduit 81, the gaseous materials are recirculated, at least in part, through conduit 82 to the drier 64 for temperature control of the heating and fluidizing gases passed through conduit 85 between furnace 68 and dryer 64. Any gases in excess of tempering requirements are discharged through conduit 83 into a collecting duct 84 for delivery to the furnace 10.

The furnace 68 may be of any conventional construction fired with any fuel to generate the hot gases used in the fluid bed dryer 64. However, in the embodiment shown the furnace 68 is of the cyclone type fired by pulverized coal delivered thereto through conduit 86, as prepared in the pulverizing equipment 87 serving the furnace boiler 10. Advantageously, the use of a cyclone furnace permits the removal of major portions of the coal ash in molten slag form to minimize inclusion of ash in the pellets delivered by the elevator 75 to pellet storage tank 88.

The pellets containing magnesium sulphite and pulverized coal with minor amounts of other materials are fed from the tank 88 through a feeder 90 and chute 91 into an elevator 92 for discharge into a thermal converter which in the form shown is a two stage fluidized bed reactor 93. The reactor is provided with two vertically spaced grids 94 and 95 with pellet beds 96 and 97 formed above the respective grids. The incoming pellets pass through a conduit 98 which has its lower end submerged in the fluidized bed 97, and a separate conduit 100 is vertically disposed to extend through the grid 95 so as to transfer overflow of pellets from the upper bed 97 to a discharge position submerged in the lower bed 96. A plenum chamber 101 beneath the grid 94 receives a contolled flow of fluidizing air through a conduit 102 from a blower 103. After start-up, when a supplemental fuel is used to initiate combustion of the coal in the pellets, the incoming flow of air will both fluidize the beds 96 and 97, and combine with the carbon in the pellets to thermally react the magnesium sulphite crystals to form reactive magnesium oxide particles and to release the sulphur as gaseous sulphur oxides and/or hydrogen sulphide.

In the illustrated embodiment of the invention, the gaseous $SO_2$ leaving the reactor 93 through conduit 104 is passed through a chamber 105 with air introduced through duct 106 from fan 107. The temperature of chamber 105 and the gases passing therethrough are regulated by indirect heat exchange with a flow of cooling air passed therethrough by ducting 108 supplied from a fan 110.

The gases leaving the chamber are passed through suitable cyclones 111 and bag houses 112 for removal of entrained solids. The solids removed from the entraining gases are discharged through conduits 115 and 116 to the magnesium oxide storage tank 37 where they are combined with the particles discharged from the reactor 93 through the duct 113 and feeder 114.

The MgO particles obtained from the fluidized bed reactor 93 and from the cyclone and bag house are combined in the tank 37 for controlled discharge via feeder 122 and pipe 123 into a makeup pipe 38 where it is mixed with water introduced through pipe 118 discharging into the absorption system of the process. The transportation of the MgO particles in a water stream to form a pumpable slurry leads to some hydration of the MgO during transit to the absorption tower 33.

The dust free gases may then be passed (as shown) to an acid producer 120 such as a conventional contact plant where the liquid effluent will be a high quality sulfuric acid pumped to storage through pipe 121 and the by-product gases are returned to the furnace 10 through conduit 84.

In the operation of the system disclosed, the two stage scrubbing arrangement includes a venturi scrubber 15 for particulate removal followed by a tower 33 for $SO_2$ absorption. The tower 33 operates with slurry having a solids content leaving the scrubber of approximately 30 percent. The slurry contains magnesium compounds which are converted to $MgSO_3 \cdot 6 H_2O$ crystals in the scrubber.

Liquid in the effluent from the scrubber 33 is separated from the crystals in the centrifuge 48. This liquid effluent will contain some fine ash which escaped the scrubber 16 or as originating from coal used in the pelletizing stage of the system. Ordinarily, a contained ash will not be particularly detrimental but if necessary some of the slurry may be passed directly to the tank 54 by way of pipe 55. Such ash would then be recycled through the particulate scrubber 16 and the filter 31 for removal. The separated $MgSO_3 \cdot 6 H_2O$ crystals discharged from the centrifuge 48 are passed to the crystal converter 52 for separation of a portion of the water of crystallization therefrom to reduce the drying requirements required later in the process. The crystals and water are separated in the centrifuge 62 with the crystals washed with solution obtained from the venturi scrubber via pipe 43. The solution from the scrubber will contain a high percentage of $MgSO_4$ which is used to coat the crystals during their subsequent pelletization. The effluent liquids from both centrifuges accumulate in tank 54 and is returned to the venturi scrubber 16 for some absorption of $SO_2$ which occurs and converts some of the $MgSO_3$ to the soluble form $Mg(HSO_3)_2$ which in turn reduces the pH sufficiently to maintain magnesium compounds in solution which permits separation of the ash in the filter 31. At the same time, the dolomite added to the tank 26 permits the magnesium to go into solution at least in part, with the liquid while the calcium forms in the form of an insoluble $CaSO_3 \cdot 2 H_2O$ which can be separated from the liquid. A major portion of the solids are thus separated in the filter 31, with the calcium discharged to waste. The liquid obtained in the filter 31 is divided into three streams:

1. A stream which is passed through pipe 43 to the centrifuge 62.
2. A stream passed through pipe 63 to drier 64 to provide $MgSO_4$ which serves as a binder in the agglomeration of the magnesium sulphite crystals and coal to pellet form.
3. The remainder of the filtrate is passed through pipes 42, 38, and 35 to mix with the MgO slurry for delivery in the absorbing tower 33.

The green pellets from the pug mill 66 are delivered to the drier 64 where additional magnesium sulphate and heat permits the formation of relatively hard pellets which are then passed through the system to the reactor 93. The agglomeration and drying of the pellets is accomplished at a temperature of around 400°F, where gases and any entrained dust from the drier is passed through the conduit 83, 84 to the furnace 10.

Regeneration is effected in the fluidized bed reactor at a temperature range of the order of 1,200°F. to 1,800°F. where the coal in the pellets provides the fuel required in the process. The effluent gas leaving the reactor through the line 104 contains approximately 14% $SO_2$ and is mixed with air, cooled as required and passed to a direct contact acid plant for the production of sulphuric acid.

It will be appreciated that by minor modifications in the amount of coal added to the pellets and an accurately controlled air flow to the reactor 93 a product containing a mixture of $H_2S$ and $SO_2$ may be formed. In fact, the relationship of the two gases can be closely controlled so that the gaseous product may be passed to a conventional Claus process plant for the direct production of sulphur. Under such conditions there will be no need to add air to the gas, as in heat exchanger 105, or water (or steam) to an acid contact plant 120, since such devices will be omitted with the substitution of the conventional Claus plant.

In either event where sulphur or sulphuric acid is produced the effluent gas from the process may be returned directly to the furnace 10.

What is claimed is:

1. In a system for the removal of gaseous $SO_2$ contained in the flue gas resulting from the combustion of a sulphur containing fuel, wherein the flue gases are cleaned in a wet scrubbing stage to reduce the entrained solid matter therein and to produce a liquid containing magnesium sulphate in solution, and thereafter contacted by a gaseous $SO_2$ absorbing liquid containing magnesium oxide to produce hydrous crystals of magnesium sulphite, separating the crystals from the liquid, heating the crystals to reduce the water of crystallization therewith, the improvements which comprise mixing the magnesium sulphite crystals with a granulated carbon containing solid material, compacting the mixture so formed, heating the compacted mixture in the presence of a binder consisting of said liquid produced in said wet scrubbing stage to form magnesium sulphate coated pellets, thermally treating the pellets to decompose the crystals of magnesium sulphite to $SO_2$ and MgO and to reduce the magnesium sulphate in the presence of carbon to $SO_2$ and MgO, and separating the product of thermal treatment to produce separate streams of a gaseous effluent containing concentrated $SO_2$ gases and particles of magnesium oxide.

2. In a system according to claim 2 wherein the absorbing liquid is composed of a slurry of magnesium oxide and magnesium hydroxide.

3. In a system according to claim 2 wherein the magnesium oxide content of the slurry is of the order of 10 to 50 percent by weight.

4. In a system according to claim 1 wherein the liquid from the wet scrubbing step is separately thickened with the cleaner liquid recirculated to the scrubbing contact zone.

5. In a system according to claim 4 wherein the thickened liquid is mixed with dolomite as a makeup of magnesium in the system.

6. In a system according to claim 1 wherein the carbon containing solid material consists of pulverized coal.

7. In a system according to claim 1 wherein the pellets are heated to a temperature of the order of 1,200°–1,800°F. to produce reactive magnesium oxide particles and $SO_2$ containing effluent gases.

8. In a system according to claim 7 wherein the magnesium oxide particles are separately passed as a slurry to the gaseous $SO_2$ absorbing zone.

9. In a system according to claim 7 wherein the $SO_2$ containing effluent gases are separately passed to an acid plant to form sulphuric acid with the excess gases from the acid plant recycled to the combustion process forming the flue gases.

10. In a system according to claim 1 wherein the pellets are heated to a temperature of the order of 1,200°–1,800°F. to produce reactive magnesium oxide particles, and an effluent gas containing $SO_2$ and $H_2S$.

11. In a system according to claim 10 wherein the effluent gases are passed to a processing plant to form elemental sulphur.

* * * * *